United States Patent [19]
Christensen et al.

[11] Patent Number: 6,055,543
[45] Date of Patent: Apr. 25, 2000

[54] FILE WRAPPER CONTAINING CATALOGING INFORMATION FOR CONTENT SEARCHING ACROSS MULTIPLE PLATFORMS

[75] Inventors: Steve W. Christensen, Palo Alto; John M. Dasher, Scotts Valley; Robin E. Martherus, San Jose, all of Calif.

[73] Assignee: Verano, Mountain View, Calif.

[21] Appl. No.: 08/976,192

[22] Filed: Nov. 21, 1997

[51] Int. Cl.[7] .................................................. G06F 17/30
[52] U.S. Cl. ............................ 707/104; 707/10; 345/302; 379/202
[58] Field of Search ..................... 707/10, 104; 345/302; 395/193, 200, 611; 379/202

[56] References Cited

U.S. PATENT DOCUMENTS

| | | | |
|---|---|---|---|
| 5,241,671 | 8/1993 | Reed et al. ................................. | 707/104 |
| 5,379,419 | 1/1995 | Heffernan et al. ....................... | 395/600 |
| 5,383,029 | 1/1995 | Kojima ..................................... | 358/403 |
| 5,388,196 | 2/1995 | Pajak et al. ............................... | 395/153 |
| 5,457,798 | 10/1995 | Alfredsson ............................... | 395/700 |
| 5,465,363 | 11/1995 | Orton et al. .............................. | 395/700 |
| 5,475,845 | 12/1995 | Orton et al. .............................. | 395/700 |
| 5,493,677 | 2/1996 | Balogh et al. ............................ | 395/600 |
| 5,497,491 | 3/1996 | Mitchell et al. .......................... | 395/700 |
| 5,519,868 | 5/1996 | Allen et al. ............................... | 395/700 |
| 5,535,389 | 7/1996 | Elder et al. ............................... | 395/700 |
| 5,557,742 | 9/1996 | Smaha et al. ............................. | 395/186 |
| 5,561,795 | 10/1996 | Sarkar ...................................... | 395/600 |
| 5,581,760 | 12/1996 | Atkinson et al. ........................ | 395/700 |
| 5,740,425 | 4/1998 | Povilus .................................... | 395/611 |
| 5,758,085 | 5/1998 | Kouoheris et al. ...................... | 395/200 |
| 5,802,361 | 9/1998 | Wang et al. .............................. | 379/202 |

*Primary Examiner*—Wayne Amsbury
*Assistant Examiner*—Thu-Thao Havan
*Attorney, Agent, or Firm*—Stuart T. Auvinen

[57] ABSTRACT

Arbitrary content-files on arbitrary computing platforms are enclosed by content-wrappers. The content-wrapper also binds searchable metadata that describes the content-files within the content-wrapper, as well as user-defined metadata. The metadata can include a title, author, date, and keywords that describe the content-file. The metadata provides searchable text for arbitrary content-files, including non-textual content-files such as graphics, audio, video, and multimedia content. Thus non-textual as well as textual data can be searched. The format of the original content-file is unimportant since the content-file is wholly embedded within the content-wrapper, or a reference (such as a URL) to the content is embedded within the content-wrapper. Content-wrappers can thus enclose any kind of file or even a data stream. Content-wrappers are designed for different computers and operating systems such as Microsoft-Windows-based PC's, UNIX workstations, and Apple Macintosh computers. Since the searchable metadata resides with the content-files on distributed platforms, a centralized search database is not needed. Instead, a search is conducted by successively reading the searchable metadata in wrappers on each computer connected to a network. A mapping metadata tag is used to provide a broad category that groups together various local names for metadata tags with similar meaning. Different applications can use different local names for metadata, yet the mapping metadata tag allows these local names to be searched together as a single criteria.

18 Claims, 12 Drawing Sheets

PRIOR ART

PRIOR ART

FILE WRAPPER CONTAINING CATALOGING INFORMATION FOR CONTENT SEARCHING ACROSS MULTIPLE PLATFORMS

FIELD OF THE INVENTION

This invention relates to computer systems, and more particularly to metadata tags in a file wrapper to facilitate searching.

BACKGROUND OF THE INVENTION

The information revolution has generated vast amounts of data. Originally, this data consisted mostly of textual information stored in text-based computer files on a computer. Finding a particular piece of data was accomplished by a search for a text string of all files on a computer.

Today, this data manifests itself not only in files, but in data streams as well. Data streams have no particular beginning or end. These streams are often used to represent video and audio information in digital computer formats.

An increasing variety of computer applications have been created, each storing its data in a different format. For example, a word processor stores data in a different format than does a spreadsheet or a drawing editor. Some applications allow for file searching by including summary information within the data files. Application-specific search engines then retrieve this summary information and compare it with search terms without having to search the entire file. For example, Microsoft Word allows a user to store information about a document such as the author, title, revision date, and keywords. Searches for particular keywords or authors can be performed by reading the summary information from many Word document files until summary information matching the search terms are found.

Unfortunately, such summary information is specific to Microsoft Word document files and cannot be used to search for keywords in other kinds of files, such as another manufacturer's word processor or a graphics file. As more and more new applications become available, each may include its own specific summary information, or no summary information at all. Thus searching for information is more difficult as new applications become available.

Figure 1:
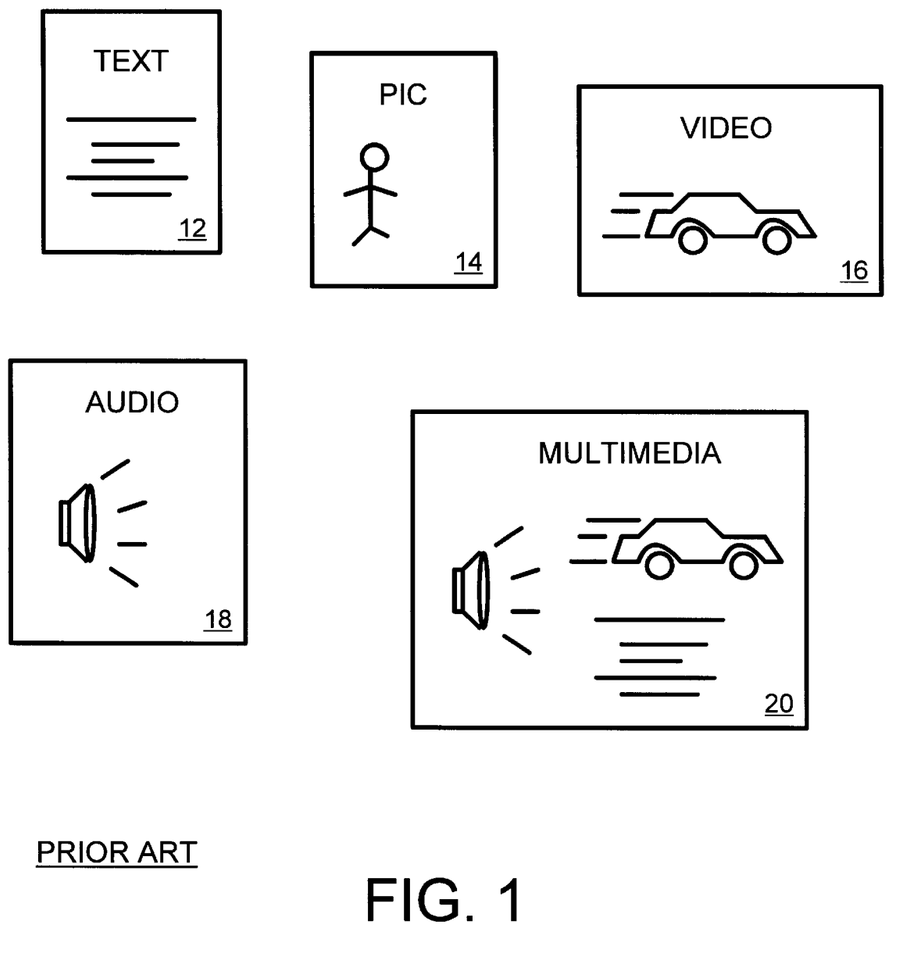
FIG. 1 shows several different kinds of files stored on a computer.

Non-Textual Files Difficult to Search—FIG. 1

FIG. 1 shows several different kinds of files stored on a computer. Text file 12 can be a simple ASCII file with textual characters, or it could be a document file in a specific format such as Novell's Word-Perfect or Microsoft's Word. These files contain mostly textual information, and a search can be performed by searching for a text string or keywords within the file. While text file 12 has been a common file type, other kinds of files are becoming more common as the graphics and multimedia capabilities of computers improves.

Graphics file 14 contains one or more pictures. These pictures can be formatted as a grid of pixels or a bit-map, or in a vector format that describes the outlines of shapes within the picture. Graphics file 14 is basically non-textual, and searching for a particular graphics file on a computer is difficult. Sometimes a viewer is used to display small "thumbnails" of many pictures, allowing the user to visually search for a desired picture. Occasionally the file name for the picture is descriptive, or summary information such as keywords are stored by a specific graphics program in a proprietary format.

Video file 16 is a video file that contains a sequence of pictures that are rapidly displayed by a video or movie application program. Video file 16 is often requires a large amount of storage space, and the sequence of frames or pictures is often compressed. Again, searching is difficult since the content of video file 16 is an image, not text. Audio file 18 contains binary data that is sent to an audio or sound card on a computer to activate speakers. Many different types of audio files are used, such as for generating sound by controlling a music synthesizer, or directly controlling audio output to the speakers, such as a voice-clip file. Since audio file 18 contains binary values representing audio intensity at a point in time, or frequency of sound generated, little or no text is contained in audio file 18. The lack of text in audio file 18, as well as graphics file 14 and video file 16, makes text-based searching unfruitful.

Often two or more file types are combined for multimedia. Multimedia file 20 contains audio, video, and textual information in a single file. Searching of the textual information is possible, although searching for a video or audio sequence is still difficult unless the text happens to describe the audio or video.

Not only are the different kinds of non-textual files difficult to search, each manufacturer can develop its own specific format for the file content. Hundreds of file formats are common today in what has become a virtual tower of Babel of proprietary data formats.

Figure 2:
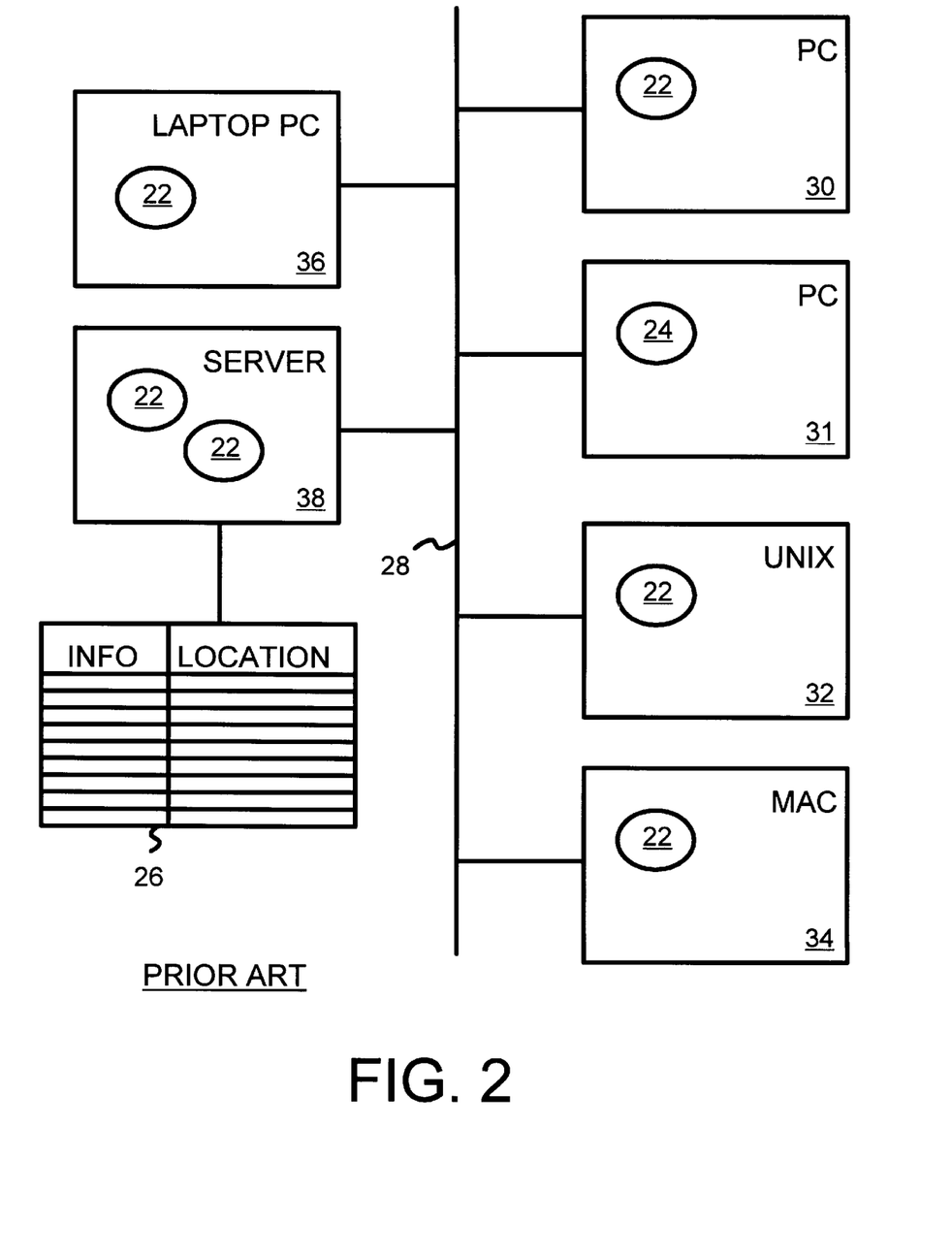
FIG. 2 shows a network with distributed content but a centralized search database.

Searching Across Networks—FIG. 2

While the array of file formats complicates searching, computers are often linked together in wide-reaching networks. Data is no longer stored in centralized mainframe computers. Instead, data is distributed among many desktop personal computers (PC's) and even on portable PC's that are not always connected to a computer network. Larger networks such as the Internet or organization-wide Intranets often use search engines that build databases of the available data.

FIG. 2 shows a network with distributed content and a search database. Network 28 connects several different computers together allowing each to remotely access files on another system. Files are created and stored on different computer systems connected to network 28. For example, PC 30 stores one or more files 22, while PC 31 stores file 24. Other files 22 are stored on other computers attached to network 28, such as UNIX workstation 32, Apple Macintosh Computer 34, server 38, and laptop PC 36. Laptop PC 36 is only occasionally connected to network 28. UNIX workstation 32 uses radically different file formats than does Apple Macintosh Computer 34, or PC 30.

Each of the files 22 can be textual files or other kinds of files such as graphics or multimedia files. A search engine operating on server 38 builds a search database by reading a list of files on each PC or computer attached to network 28, and perhaps extracting the most-commonly used words in a text document as keywords.

Search database 26 is constructed by the search engine on server 38. Information about each of files 22, 24 is stored in database 26. Information stored in database 26 can include file names, and keywords extracted from files 22, 24. The locations of each file 22, 24 is also stored in database 26. Thus a centralized search database 26 is constructed even though the content, files 22, 24, are located in various locations on network 28.

When a user performs a search for a particular keyword or file name on network 28, the search engine on server 38 searches through database 26. The information in database 26 is the information that is actually searched rather than the files themselves. Database 26 must be frequently updated since files 22, 24 may change frequently and even be deleted.

Out-of-date search databases 26 are a nuisance, as Internet users can attest. Often a search is performed and a link followed only to get a "DNS Server Not Found" error when the file or site no longer exists.

While search databases have been useful, they generate additional network traffic since the search engine must constantly crawl the network to update file information. This additional network traffic reduces performance of other, more important network tasks. As the number of computers and files on a network increases, greater network bandwidth is required for updating search databases.

What is desired is a file-search system that does not generate additional network traffic for its maintenance. A fully up-to-date search system is desired. It is desired to eliminate the centralized search database. It is desired to search files that are distributed across a network without using a centralized search database. It is desired to search for content within a file regardless of the file type or the computer system the file resides on. It is further desired to bind search information with the file itself. It is desired to search for non-textual files such as graphics, video, audio, and multimedia files. It is desired to bind search information with these non-textual files regardless of file format or the type of computer system the file is located on.

SUMMARY OF THE INVENTION

A content-wrapper binds searchable metadata to content files. The content-wrapper includes content in an arbitrary computer-readable format.

A plurality of metadata tags describe the content. The metadata tags are bound to the content by the content-wrapper within a single computer-readable file. The plurality of metadata tags contains textual information readable by search software. The metadata tags are read by the search software but the content is not read by the search software.

Thus the search software searches the metadata tags bound with the content that is in the arbitrary computer-readable format. The arbitrary computer-readable format of the content includes textual formats, graphics formats, audio formats, and video formats. Thus non-textual file formats are searchable by the plurality of metadata tags bound to the content file.

In further aspects the arbitrary computer-readable format includes Windows-readable formats when the content is created on a Windows-based personal computer (PC), but it also includes UNIX-readable formats when the content is created on a UNIX-based computer. Thus the content-wrapper binds searchable metadata to content on different computing platforms.

In still further aspects of the invention, the search software directly reads the metadata tags from the content-wrappers when performing a search for a user. The search software does not access a centralized search database of searchable metadata. Thus the search software performs a distributed-metadata search without the centralized search database.

In further aspects of the invention the plurality of metadata tags include several tags. A title tag contains a title of content in the content-wrapper. An author tag contains a name of a person that generated the content in the content-wrapper. A date tag contains a date for the content in the content-wrapper, and a keywords tag contains keywords describing the content in the content-wrapper.

In other aspects a metadata tag in the plurality of metadata tags has a tag identifier that uniquely identifies a search category for the metadata tag. A localized name contains a textual name displayed to a user for the search category.

A mapping field contains a global category for the metadata tag. The global category groups together metadata tags of different content-wrappers with different tag identifiers and different textual names for the search category for metadata tags with a similar purpose. A tag data field contains metadata describing the content of the content-wrapper.

DETAILED DESCRIPTION

The present invention relates to an improvement in information search and discovery using traditional computer search systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Information about the content of a file or data stream is known as metadata. The inventors have realized that metadata can be stored with the content in a logical container called a wrapper. One or more wrappers can then be grouped together and stored in a physical container called a package. Additionally, search index information for both the wrapper content and metadata is stored in the package. Wrappers have been used to enclose program code for transport or interface to a foreign computer or operating system. See for example U.S. Pat. Nos. 5,475,845 and 5,465,363 by Orton et al., and assigned to Taligent Inc. of Cupertino, Calif., which use code-wrappers for transport between operating systems.

Rather than enclosing program code, the inventors use wrappers to enclose content. Content can be a document file, and audio or video clip, a multimedia file, or a reference to a file or data stream. The specific format of the file is unimportant, so any manufacturer's particular file format can be enclosed by a wrapper. The type of computer system and its operating system (O/S) is also unimportant, so both the original unwrapped content as well as the wrapped content can reside on diverse systems such as PC's, Macintosh's (Mac's), or UNIX workstations.

Figure 3:
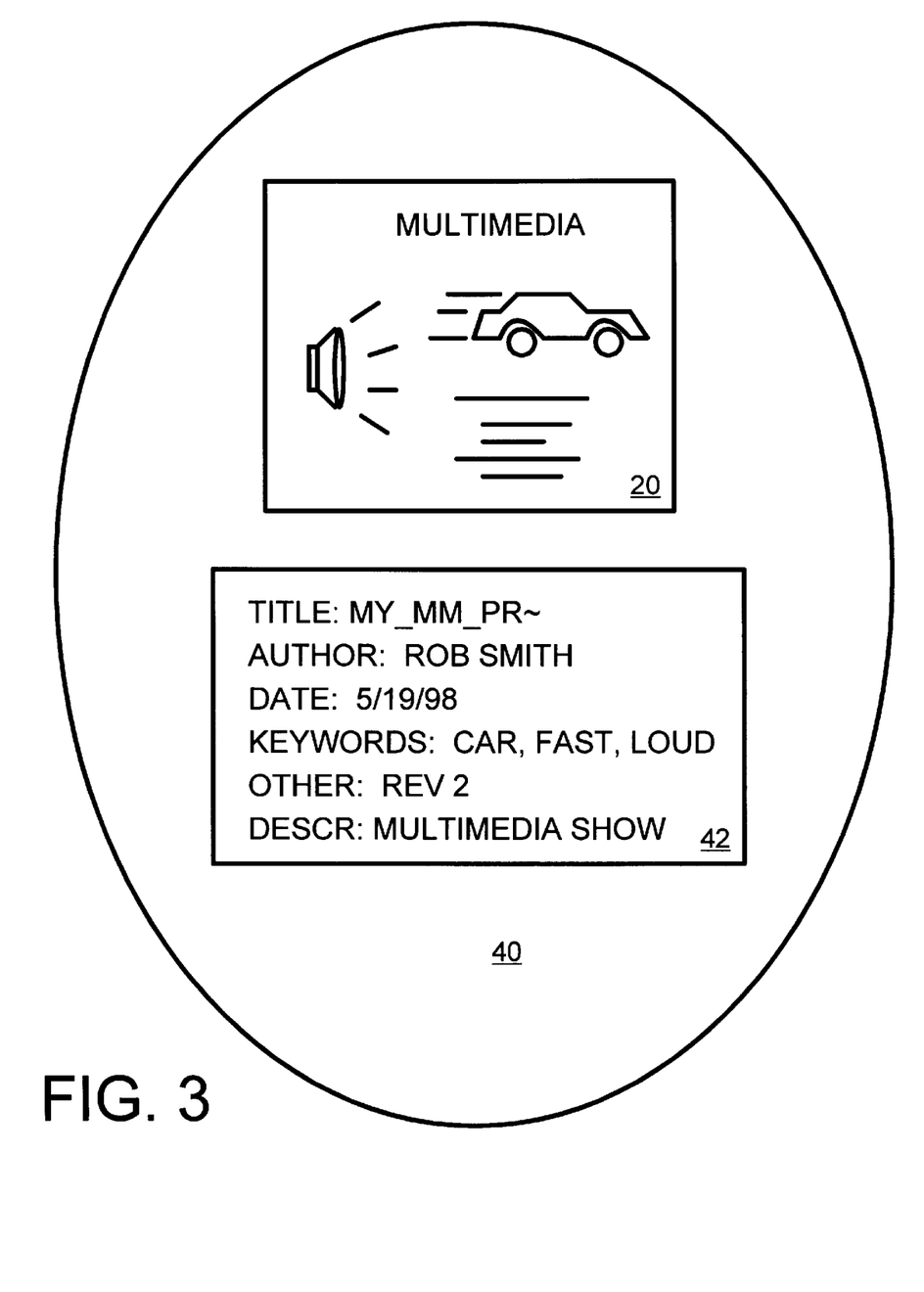
FIG. 3 is a diagram of a content-wrapper that encloses a multimedia file and searchable metadata describing the contents of the multimedia file.

Content Wrapper Encloses Arbitrary Files—FIG. 3

FIG. 3 is a diagram of a content-wrapper that encloses a multimedia file and searchable metadata describing the contents of the multimedia file. Multimedia file 20 is a multimedia presentation that includes audio, video, and textual information in a single file. Metadata 42 describes the content of multimedia file 20. Metadata is one or more pieces of information associated with a piece of content that describes the content, such as its name, type, author, date of creation or modification, description, etc.

Metadata 42 includes several distinct pieces of information about multimedia file 20. The title of multimedia file 20 is "my_mm_p~", shorthand for "my multimedia presentation". The author is "Rob Smith", while multimedia file 20 was created on May 5, 1998. Search keywords "car, fast, loud" are also part of metadata 42, as is the revision number (2) and the type of file (multimedia presentation). Other fields of metadata can be included.

Metadata 42, the searchable information, is bound to multimedia file 20, the content, by wrapper 40. Wrapper 40 is a logical container that houses both the content and its metadata. Since wrapper 40 can enclose graphics, audio, and other non-textual files, wrapper 40 can provide searchable text for these kinds of files that otherwise cannot be searched for.

Figure 4:
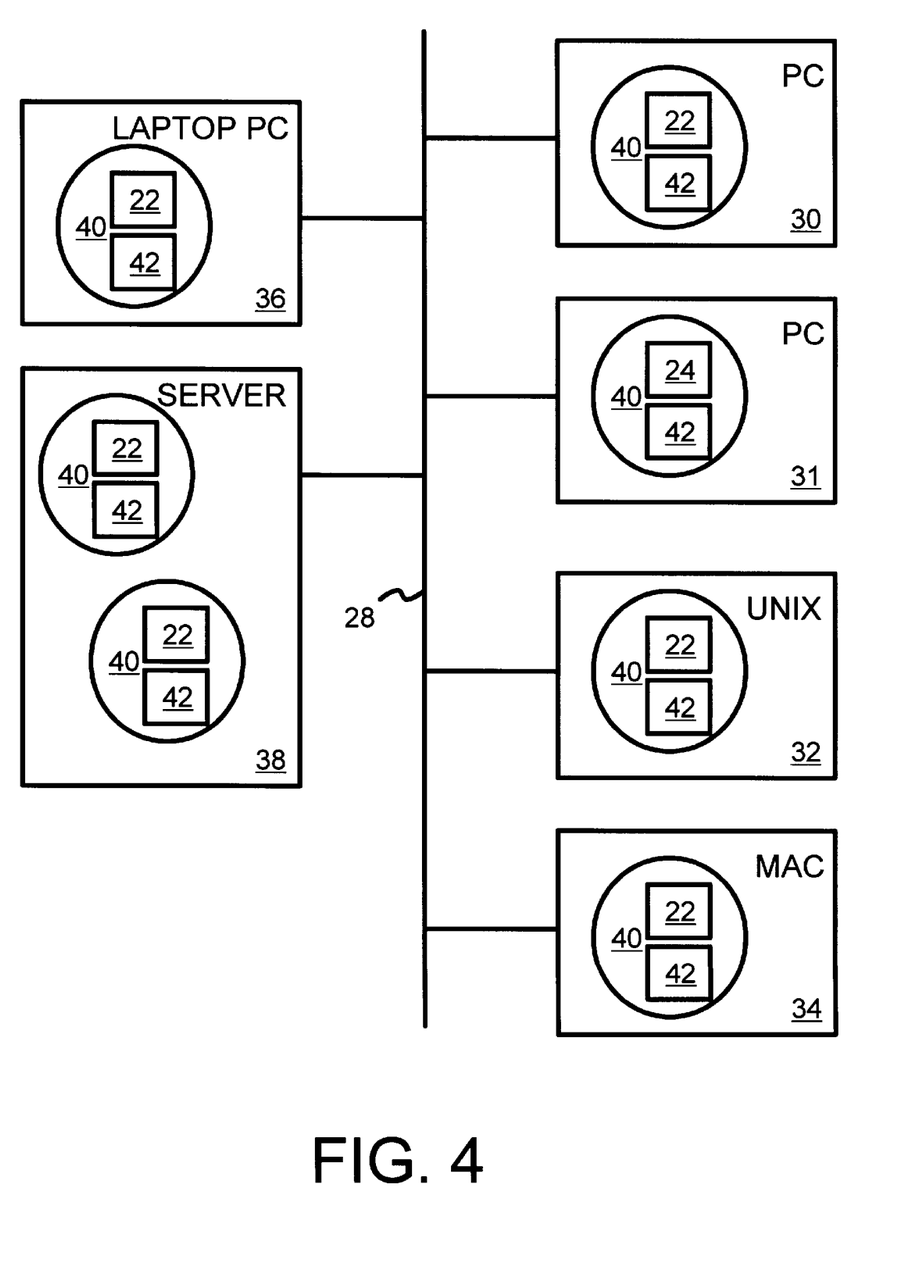
FIG. 4 shows content-wrappers distributed across a computer network having arbitrary platforms.

Searching Wrappers Distributed On Arbitrary Platforms—FIG. 4

FIG. 4 shows content-wrappers distributed across a computer network having arbitrary platforms. A variety of dissimilar computing platforms are used today. Office workers may prefer to use Microsoft Windows-based PC's, while engineers may prefer UNIX workstations. Graphics designers may use Apple Macintosh computers, while administrators use RISC-based servers. Each platform uses different operating systems and different file formats. Content created on one platform may be useful to a worker on another platform.

Different content in files 22, 24 and different metadata 42 exist on several different systems connected to network 28. These systems include PC 30, PC 31, UNIX workstation 32, Apple Macintosh computer 34, laptop PC 36, and server 38. File 22 on PC 30 may be a text file while file 22 on UNIX workstation 32 may be a graphics file.

Content-wrappers 40 are used to enclose content files 22, 24 and provide an interface to these other platforms. Metadata 42 is bound with each content file 22, 24 by wrappers 40. Metadata 42 is useful when searching for a file having particular contents. A search engine can read the metadata fields of all package files on many separate computers to find matching terms. For example, a search for a particular author or particular keywords can read metadata 42 on laptop PC 36, then read metadata 42 on PC 30, then read metadata 42 on UNIX workstation 32, and also read metadata 42 for each wrapper 40 on server 38. Finally, when metadata 42 on PC 31 is read, the terms in its metadata match the search criteria. Thus content file 24 on PC 31 contains the desired content identified by the search criteria.

Rather than retrieve the entire wrapper 40 and transmit it across network 28, only the metadata needs to be accessed to perform the search. Traffic on network 28 is greatly reduced since only metadata 42 and not content files 22 are transferred across network 28 during a search. The searching PC or network node simply reads the metadata 42 and compares it to the search criteria. If a match is found, then the content file 24 bound with metadata 42 by wrapper 40 can be retrieved, if desired.

When content file 22, 24 or metadata 42 is updated, metadata 42 is also updated to ensure that it does not become outdated or stale. When content file 22, 24 is deleted, so is its metadata 42 and wrapper 40. Thus a search cannot locate a file that has recently been deleted, as is common with Internet search engines today. Newly-created content is immediately visible to search engines once a wrapper and metadata have been generated for the new content. Thus the search system is inherently current.

Searches can be initiated from any computer or node on the network that has search software. No centralized search database is used since the search directly reads each wrapper on each computer on the network.

Figure 5:
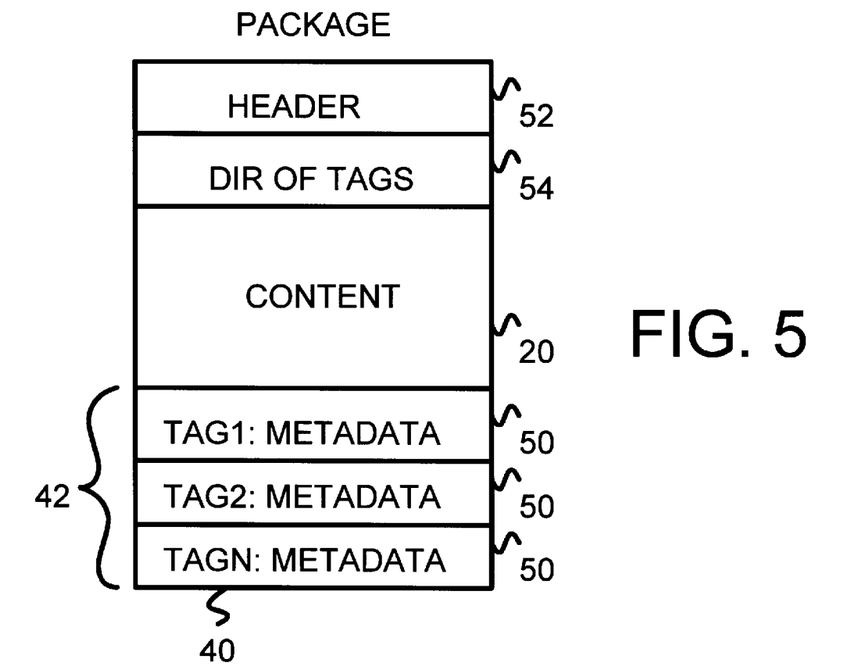
FIG. 5 is a diagram of a content-wrapper package.

Content and Metadata Bound Together in a Package—FIG. 5

While a wrapper is the logical enclosure of file content and its metadata, a package is the physical entity that contains one or more wrappers. The package is a single binary file stored on a computer's disk or other storage. Packages can be transported across computer networks as files, allowing the content and its metadata to be transported together.

FIG. 5 is a diagram of a content-wrapper package. Wrapper 40 is stored on a computer's hard disk as a package known as a "CyberWrap" package. The file extension ".cwp" is typically used to identify a binary file as a package.

Header 52 is a file header that identifies the binary file as a content-wrapper-package file. Header 52 also contains application information and a creation date for the package, and copyright information. Directory 54 contains a directory of what is in the package and offsets to each part of the file. For example, the offset within the file to the beginning of content file 20 and the offsets to each metadata item or tag 50 is stored in directory 54.

Content file 20 is embedded in wrapper 40 by including the entire content file 20 within wrapper 40. Regardless of the type of file, the binary characters of the content file 20 are simply copied to the location within the package that is occupied by the content within wrapper 40.

Each field or item of metadata 42 is known as a tag. For example, the title is one tag, the author is a second tag, the creation date is a third tag, the keywords are a fourth tag, the revision is a fifth tag, and the file type or description is a sixth tag for metadata 42 of FIG. 3. Tags 50 can be added, modified, or deleted in metadata 42.

Figure 6:
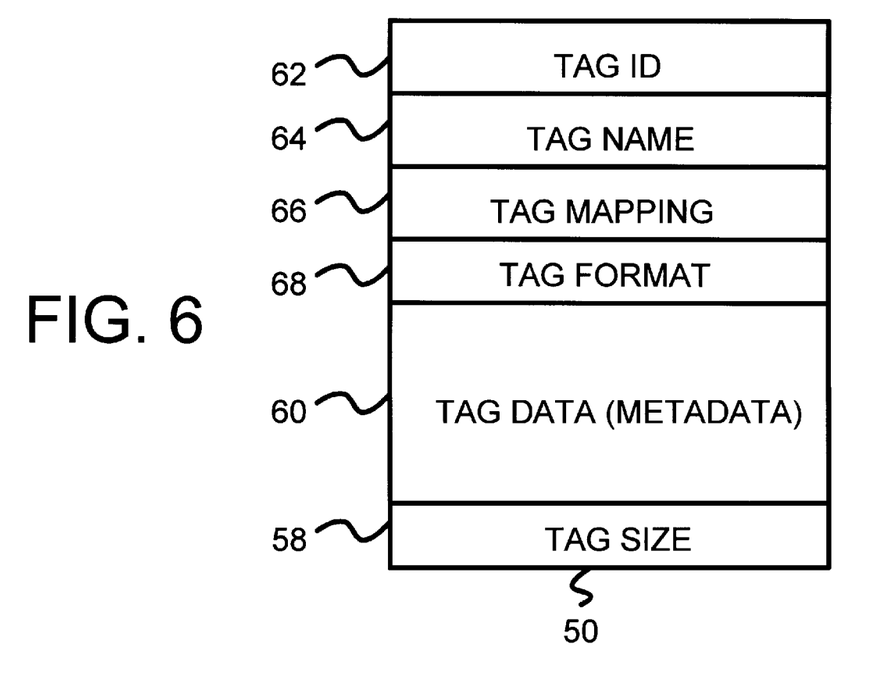
FIG. 6 highlights a tag of metadata including a tag-mapping field.

Metadata Arranged as Tags—FIG. 6

FIG. 6 highlights a tag of metadata including a tag-mapping field. Tag 50 includes the metadata itself that describes the content file, but it also contains formatting and cataloging information that helps search software find certain kinds of information.

Tag identifier 62 is a unique character string that identifies a particular tag within its namespace. This field is usually used only by the computer software to locate a particular tag. For instance, if tag identifier 62 represents the "Dublin Core" (metadata standard) date element, its identifier would be "DC.date". Search software that is looking for all Dublin Core date tags can simply read the values of all tags whose identifiers are "DC.date" and ignore all others.

Tag name field 64 contains a localized name of tag 50. This localized name is displayed to a user through a graphical user interface to search software. Since many local languages may be used by multi-national corporations and organizations, tag name field 64 can show the name of tag 50 in various local languages. For example, a Dublin Core title tag with tag identifier 62 "DC.title" might have "title" in tag name field 64 for wrappers created by English-speaking employees, but name field 64 is "titulo" for wrappers created for Spanish-speaking employees. A search can be performed on titles by matching their identifier field 62, which is the same for all languages, but displaying the local name in tag name field 64.

Tag Mapping Allows Non-Uniform Tag Naming

Tag mapping field 66 is used to map the tag to a broader category. Different programs may use different tags that contain similar information. For example, a word-processing program may use "author" as its tag identifier while a database may use "originator". A programming-code's content-wrapper tag identifier may be "coder" or "creator". All these tags are related because they all refer to the person who generated or modified the content file. A computer does not directly know that the "creator" or "originator" tags are really like an "author" tag. Tag mapping field 66 acts as a hint to searching software of the relevance of tag 50, regardless of the tag identifier chosen.

Search software can use tag mapping field 66 rather than tag name field 64 or tag identifier 62. Tag identifier field 64 might be "author" or "nombre" or "originator", but all three have their tag-mapping field 66 as "author".

Tag-format field 68 describes the formatting of the metadata. For example, a "keywords" tag might use a comma-delimited list of keywords, and its tag-format field 68 indicates that commas separate the individual search words. A "date" tag has its tag-format field 68 indicating a data rather than just a string or a number.

Since the metadata stored in tag data field 60 can vary in length, tag size field 58 is provided. Tag size field 58 indicates the length of tag 50, or alternatively, the length of metadata in tag data field 60. As keywords or other metadata is added to or removed from a tag, tag size field 58 can be increased or decreased.

Tag data field 60 contains the metadata itself that describes the content file. For example, when tag name field 64 is "date", tag data field 60 could contain "May 19, 1998" or "Apr. 4, 1999" or whatever the creation or editing date is of the content file 20 of FIG. 5. For a tag named "keywords", tag data field 60 contains the keywords that describe the content file. For a tag 50 having "copyright" in tag name field 64, tag data field 60 could contain the string "Verano, 1996–97. All rights reserved."

Figure 7:
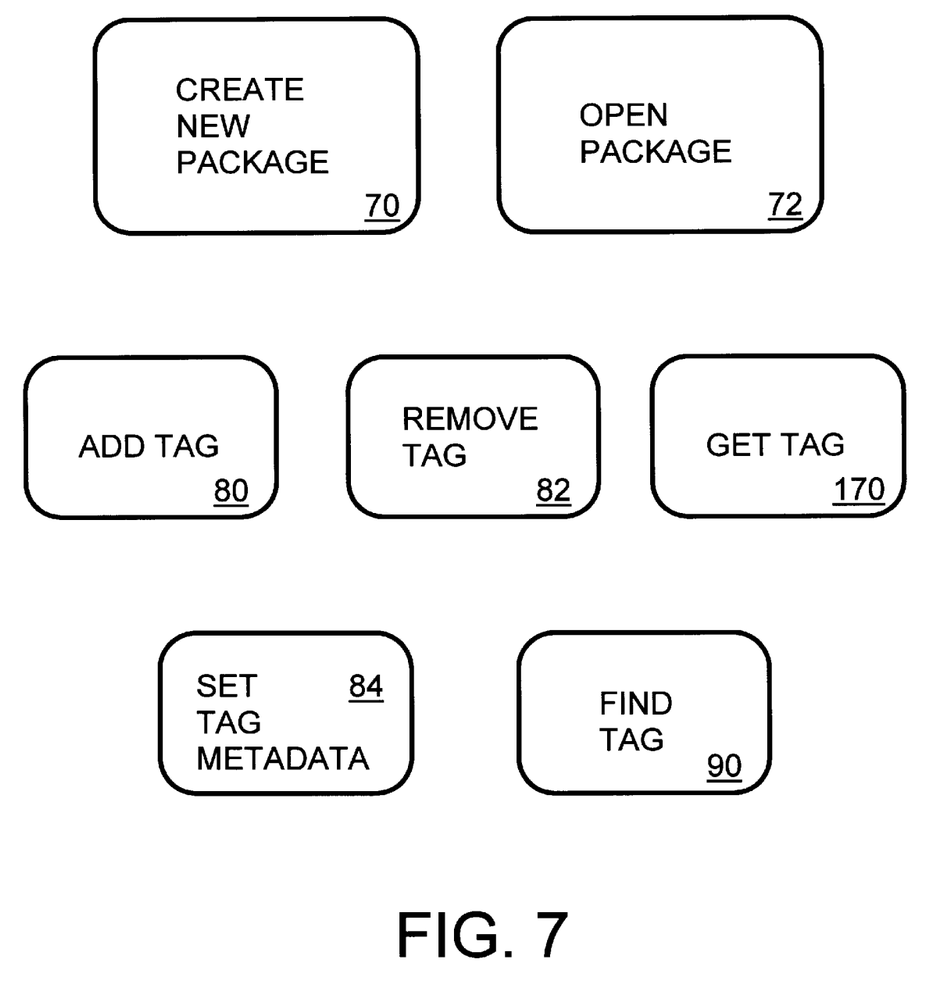
FIG. 7 is a diagram of software components for managing and searching contentwrappers.

Software Components—FIG. 7

FIG. 7 is a diagram of software components for managing and searching content-wrappers. Packages contain one or more wrappers. Package creation routine 70 generates a new package by creating header 52, directory 54, an empty root wrapper, and one or more tags 50. Values may then be added. The newly-created package can then be accessed by searching software using find-tag routine 90.

Open-package routine 72 is used to open an existing package that had previously been created with the package creation routine 70.

Other routines operate on individual tags within a wrapper, rather than on the package that contains the wrapper. A new tag is added to a wrapper by add-tag routine 80, while an existing tag can be removed by remove-tag routine 82. The metadata within a tag can be edited or modified by set-tag-metadata routine 84. Application software that updates the content file can call set-tag-metadata routine 84 to change the data in the data tag. Get-tag routine 170 can be called to read the contents of a metadata tag.

Find-Tag Routine

Figure 8:
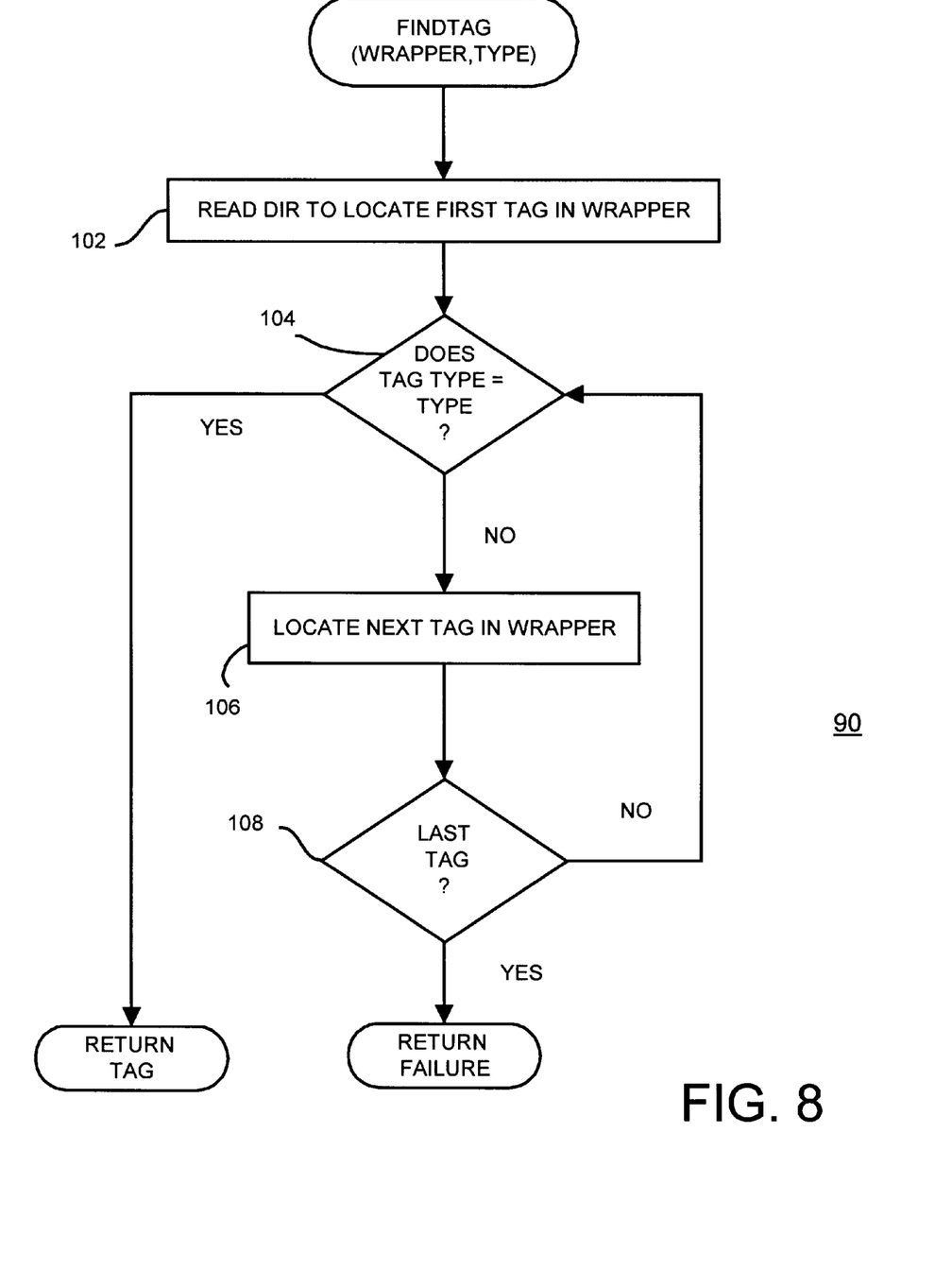
FIG. 8 is a flowchart of a find-tag routine that searches a wrapper for a particular category of metadata.

Find-tag routine 90 is used to determine the existence of a particular tag in a wrapper, given either the tag's identifier 62 or its mapping 66. If the tag is found, a reference to the tag is returned; if the tag could not be found, a null reference is returned instead. a The tag reference can then be supplied to other routines that operate on the tag itself. FIG. 8 is a flowchart of a find-tag routine that searches a wrapper for a particular category of metadata. The wrapper and the tag identifier/mapping are provided with the call of find-tag routine 90. The wrapper reference is used to identify which wrapper contains the tags to be located. Since each wrapper can contain several tags of metadata, the tag directory is read to find the location of the first tag, step 102. The type field of the first tag is read. This type field can be either the tag identifier, or the tag mapping. The type field is compared to the tag type supplied by the calling program, step 104, and if a match is found, a reference to the tag is returned.

If no match is found in step 104, then the tag directory is consulted to find the next tag in the wrapper, step 106. If no more tags are found in the tag directory, step 108, then the routine ends without finding the requested tag. Otherwise the type of the next tag is compared to the desired type, again using step 104. Tags are read and compared, repeating steps 104, 106, 108, until the desired tag type is found, or all tags in the wrapper have been compared.

Figure 9:
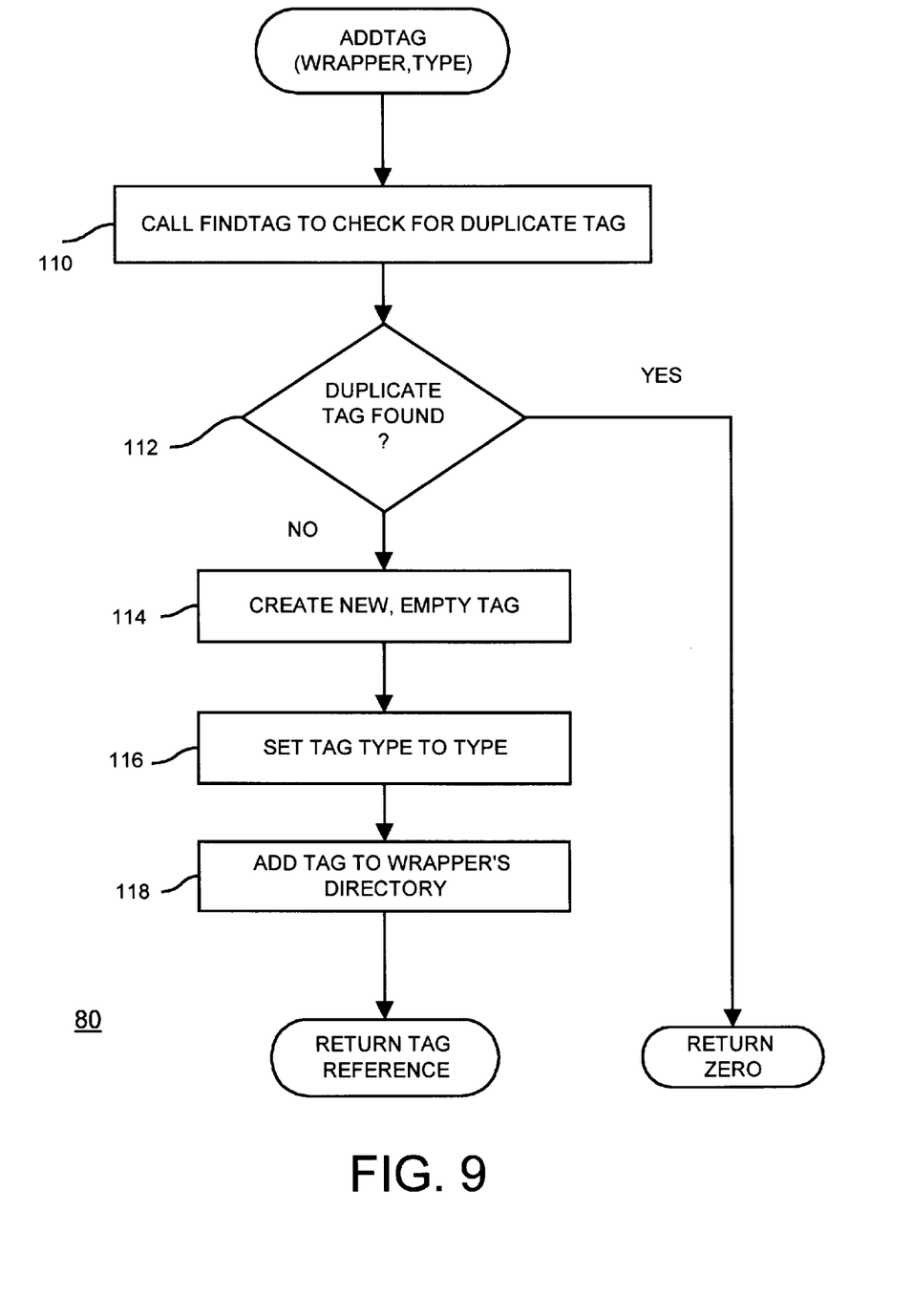
FIG. 9 is a flowchart of a routine that adds a metadata tag to a content wrapper.

Add-Tag Routine—FIG. 9

FIG. 9 is a flowchart of a routine that adds a metadata tag to a content wrapper. Sometimes a new field of cataloging information is desired to be added to existing content wrappers. For example, a new field may be added that identifies the city or location of the file. Tags named "city" are then added to each wrapper using add-tag routine 80.

The wrapper reference and the tag identifier are provided to the call of add-tag routine 80. The wrapper reference is needed since a package can have more than one wrapper. Since a wrapper may already contain the type of tag being added, find-tag routine 90 of FIG. 8 is called to see if a duplicate tag exists, step 110. If a tag already has the same tag identifier, then step 112 causes routine 80 to end with a null reference to the added tag.

When no duplicate tag is found, then a new tag is created by allocating space for the tag within the package, step 114. The tag identifier, tag name, and tag mapping are then written to the new tag's location within the package, step 116. An entry for the new tag is then added to the tag directory of the package, step 118, and the routine returns a reference to the newly-created tag. Add-tag routine 80 does not write in the metadata itself to the tag, since this metadata depends on the content itself. Instead, the metadata data field in the new tag is left empty.

Figure 10:
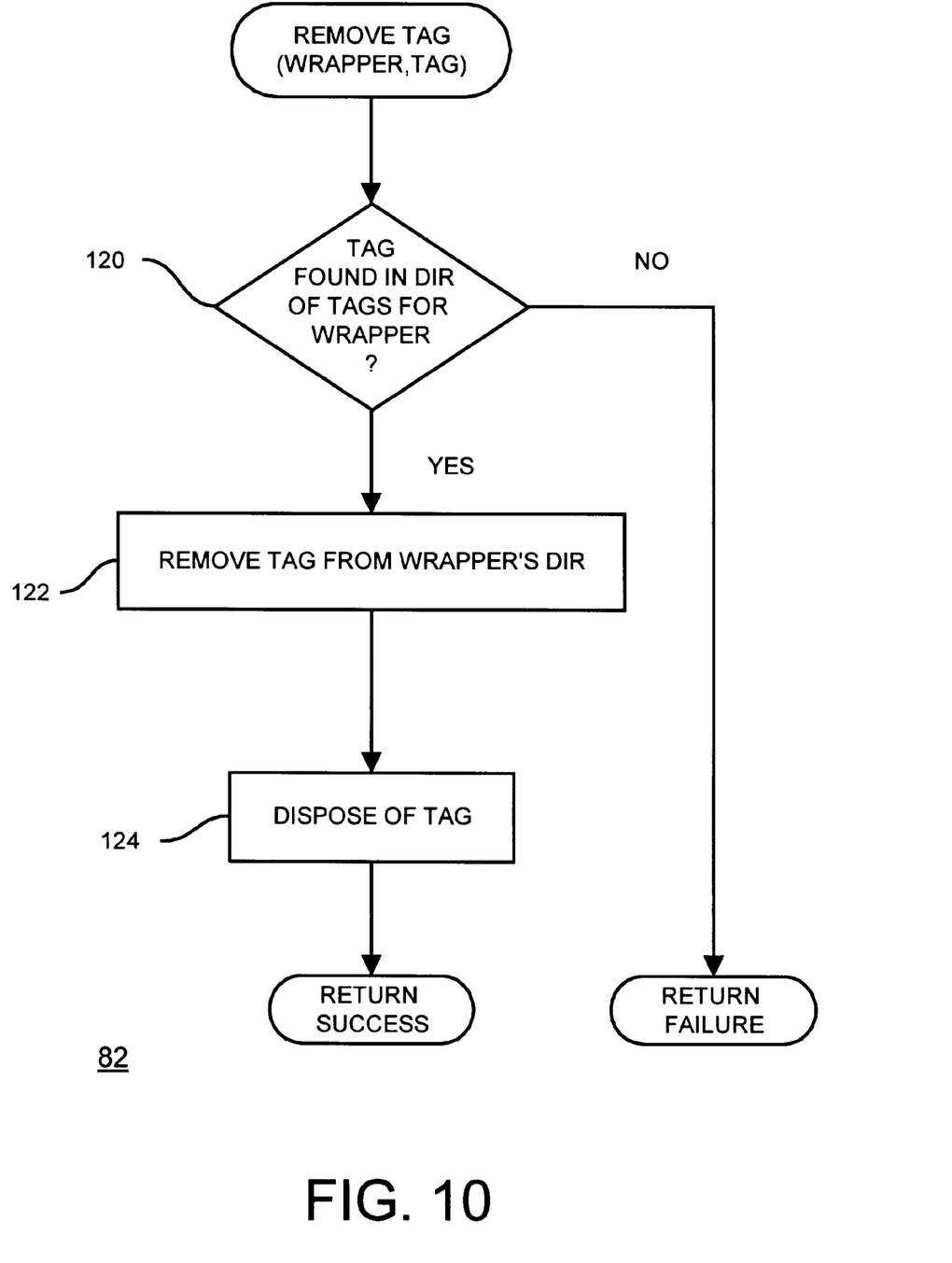
FIG. 10 shows a routine to remove an existing tag from a wrapper.

Remove-Tag Routine—FIG. 10

FIG. 10 shows a routine to remove an existing tag from a wrapper. The wrapper reference and the tag identifier are provided with the call of remove-tag routine 82. The list of tags associated with the wrapper are searched for a tag matching the given tag identifier, step 120. If no matching tag is found, then an error value is returned.

When a tag matching the tag identifier is found, then the entry for the tag is removed from the tag list, step 122. The tag itself is removed from the package, step 124, by de-allocating the space used by the tag within the package and moving up subsequent entries to reclaim the space. A successful return code is sent back to the calling program as routine 82 finishes.

Figure 11:
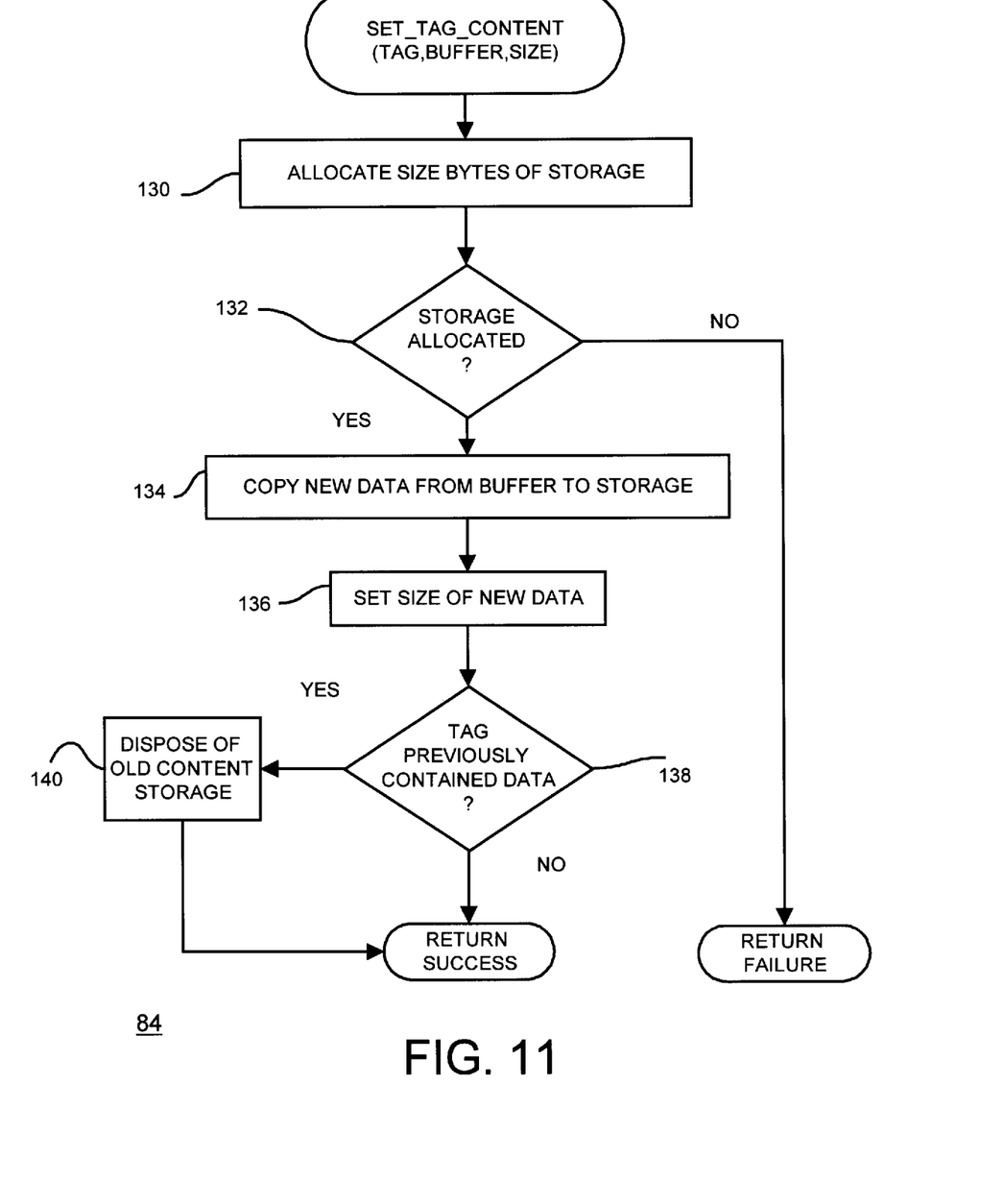
FIG. 11 shows a routine that writes metadata into a tag.

Set Tag Content Routine—FIG. 11

FIG. 11 shows a routine that writes metadata into a tag. The tag identifier or a pointer to the metadata, and the size of the metadata are sent to set-tag-metadata routine 84. Additional storage is allocated for the required size of the metadata, step 130. If sufficient storage cannot be allocated within the package, step 132, then a failure code is returned. Otherwise, the metadata is copied from a buffer or from the memory location pointed to. This metadata is copied to the allocated storage in the package, step 134. The tag-size field 58 of FIG. 6 is written with the new size of the metadata, or with the overall size of the tag, step 136.

If the data field of the tag already contains metadata, step 138, then the old metadata is discarded, step 140. If the data field of the tag already contains metadata, step 138, then the space within the package used by the old metadata is de-allocated and subsequent entries are moved up to reclaim the space. A return code indicating success is returned to the calling program as routine 84 ends.

Figure 12:
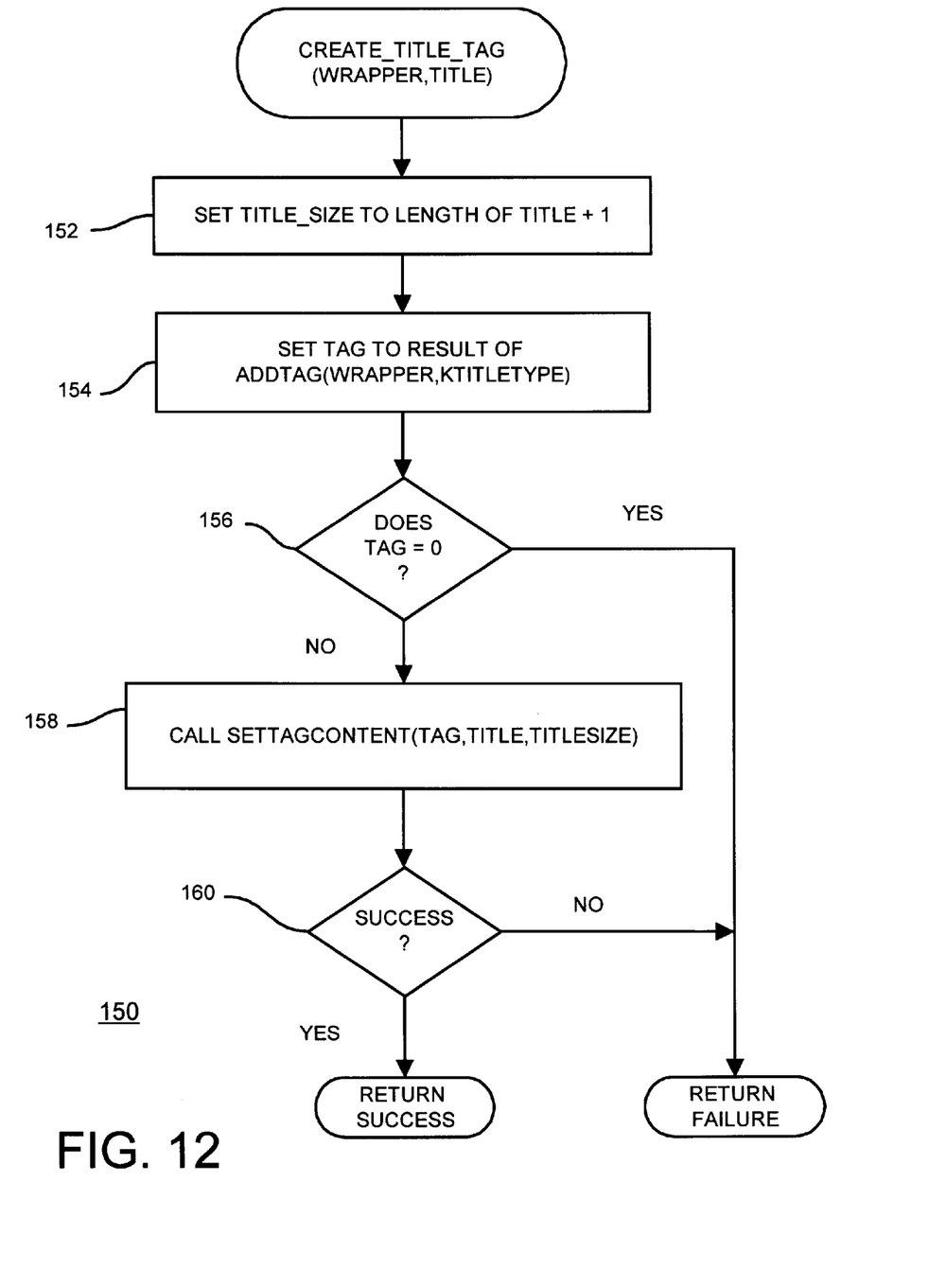
FIG. 12 shows a create-tag routine that creates a new tag and writes in metadata to the new tag.

Create Tag Routine—FIG. 12

The add-tag routine 80 of FIG. 9 added a new tag but did not write the metadata to the new tag. FIG. 11's set-tag-metadata routine 84 writes the metadata. These two routines can be combined into a single custom routine that can be used to add a title tag to a wrapper.

FIG. 12 shows a create-tag routine that creates a new tag and writes in metadata to the new tag. This routine can be used to add metadata to an existing wrapper's content file (i.e., file, data stream, etc.) within a package. The wrapper reference and the tag identifier or mapping are sent by the calling routine as parameters to create-tag routine 150.

Add-tag routine 80 of FIG. 9 is called, step 154. This routine creates a new tag, allocating storage space and writing the tag identifier, tag name, and tag mapping fields to the new tag. A reference to the new tag is returned by routine 80. If add-tag routine 80 failed, then the reference returned was zero, which is detected by step 156, ending create-tag routine 150 with an error.

Set-tag-metadata routine 84 of FIG. 11 is then called, step 158. Routine 84 writes the metadata to the new tag whose reference was returned by add-tag routine 80. If the metadata was added successfully, then create-tag routine 150 returns a success code; otherwise an error code is returned.

Figure 13:
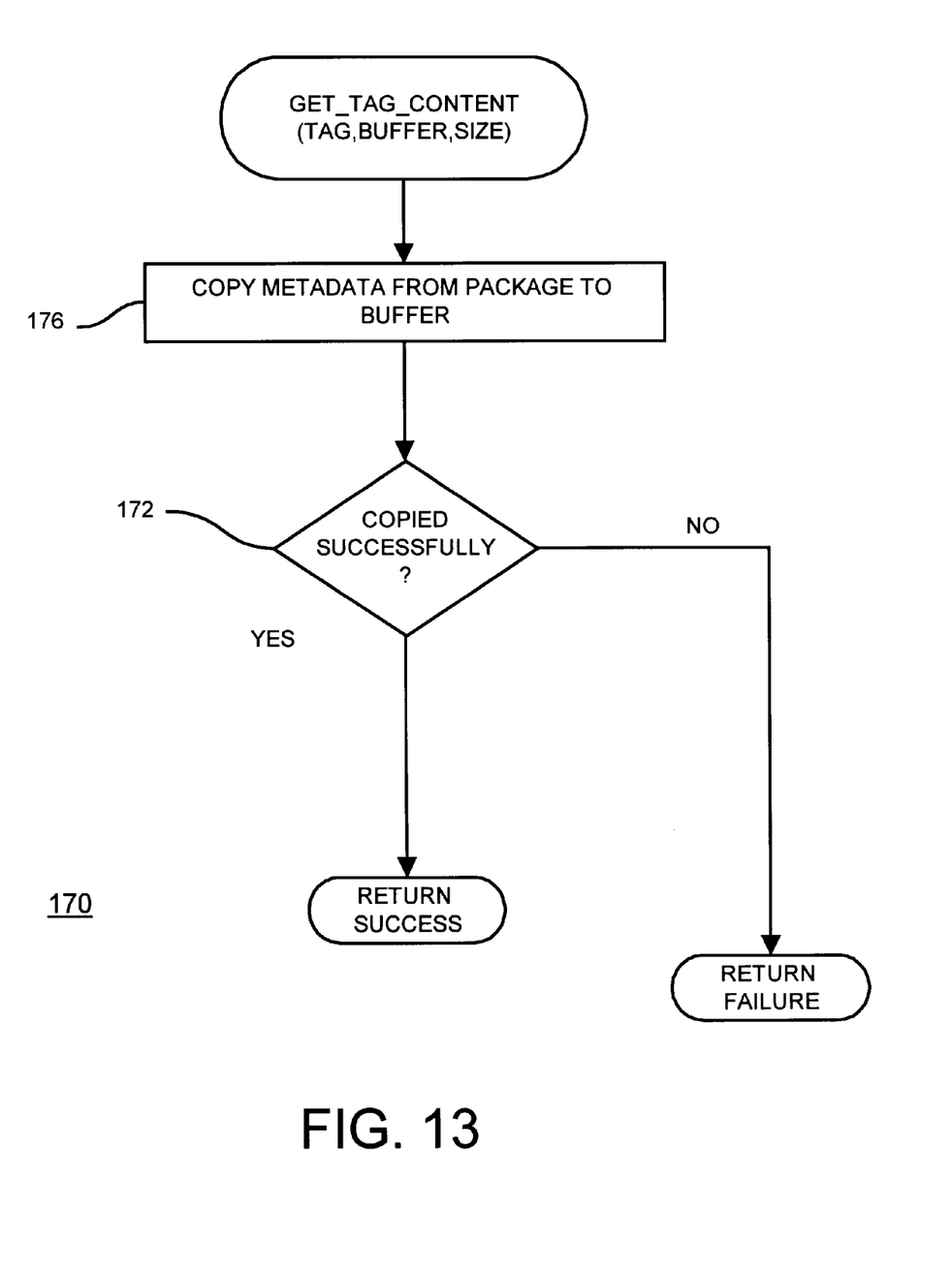
FIG. 13 shows a routine that reads metadata from a tag.

Get Tag Routine—FIG. 13

FIG. 13 shows a routine that reads metadata from a tag. The tag identifier, a pointer to an allocated buffer to hold the metadata, and the size (from FIG. 6, tag data field 58) of the requested metadata are sent to get-tag routine 170. The metadata is read from the package and copied to the buffer in memory, step 176. If the metadata cannot be copied from the package to the buffer, step 172, than a failure code is returned. If successful, a return code indicating success is returned to the calling program as routine 170 ends.

ADVANTAGES AND USE OF THE INVENTION

The centralized search database of the prior art can be eliminated, since metadata is stored with the content rather than in a search database. The content wrappers are distributed across the network, so there is no single point of failure (such as a centralized database) that can prevent searching. Additional network traffic is not generated for maintenance of a central database. The searchable metadata is always fully up-to-date since it is bound with the content file.

Files that are distributed across a network are searched without using a centralized search database. Only network tables that identify network nodes or computers need to be consulted. Binding metadata with the content file in a content wrapper enables searching, regardless of the file type or the computer system the file resides on. The search information is bound with the content file itself. Non-textual files such as graphics, video, audio, and multimedia files can be searched by their metadata tags in their wrappers. Search information can be bound with these non-textual files regardless of file format or the type of computer system the file is located on.

Rather than retrieve the entire content-wrapper and transmit it across a network, only the metadata needs to be retrieved. Traffic on the network is greatly reduced since only the metadata and not the actual content is transferred across the network during a search. The searching PC or network node simply reads the metadata and compares it to the search criteria. If a match is found, then the content file bound with the metadata by the wrapper can be retrieved, if desired.

Since the metadata is stored with the content files or data streams, the metadata does not become lost or separated from the content that it describes. When content files are updated, its search index is also updated. When content is deleted, so are their metadata and wrapper. Newly-created content is immediately visible to search engines once a wrapper and metadata have been generated for the new content. Thus the search system is inherently current. A search cannot locate a file that has recently been deleted, a common problem with Internet search engines today.

The tag-mapping field provides a broad category than many different tag names can be mapped to. This allows for variation and customization of tag names for certain applications, while facilitating searching. Cataloging as well as searching can be performed.

ALTERNATE EMBODIMENTS

Several other embodiments are contemplated by the inventors. For example, users can add additional metadata tags to wrappers. A corporation may wish to have a metadata tag called "Part Number" that describes the part number associated with the content file. Other routines can be generated from the routines described, and the routines can be modified as desired. Different routines can be written for different operating systems, such as for Microsoft Windows or for UNIX. Network protocols such as TCP/IP or higher-level protocols such as DCOM or CORBA can be used to transfer data and commands across the network to computers using dis-similar operating systems.

Rather than store the entire content file within the wrapper, the wrapper can contain a pointer or reference to the content file. The pointer effectively allows the wrapper to exist in non-contiguous memory. Using a pointer also allows local applications to directly use the content file while still providing a search interface to network applications. Technically, if a package has been indexed, only the index needs to be searched instead of searching through a potentially large number of individual metadata elements. The wrappers in a package can be arranged in a hierarchy.

A search index of the metadata tags for all wrappers in a package can be generated and stored within the package. The search index can then be consulted rather than each individual wrapper. Distributed searches read each search index for each package on a machine before moving on to another machine and reading its search indexes. Search indexes are useful for increasing search speed.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A content-wrapper for binding searchable metadata to content files, the content-wrapper comprising:

a content-file in an arbitrary computer-readable format;

a plurality of metadata tags describing content in the content-file, the metadata tags bound to the content-file by the content-wrapper within a single computer-readable file, the plurality of metadata tags containing textual information readable by search software; and wherein the metadata tags are read by the search software but the content-file is not read by the search software, whereby the search software searches the metadata tags bound with the content-file having the arbitrary computer-readable format.

2. The content-wrapper of claim 1 wherein the arbitrary computer-readable format of the content-file includes textual formats, graphics formats, audio formats, and video formats, wherein non-textual file formats are searchable by the plurality of metadata tags bound to the content-file.

3. The content-wrapper of claim 2 wherein the arbitrary computer-readable format includes Windows-readable formats when the content-file is created on a Windows-based personal computer (PC), but the arbitrary computer-readable format also includes UNIX-readable formats when the content-file is created on a UNIX-based computer, whereby the content-wrapper binds searchable metadata to content-files on different computing platforms.

4. The content-wrapper of claim 2 wherein the search software directly reads the metadata tags from the content-wrappers when performing a search for a user, wherein the search software does not access a centralized search database of searchable metadata, whereby the search software performs a distributed-metadata search without the centralized search database.

5. The content-wrapper of claim 2 wherein the plurality of metadata tags comprises:

a title tag containing a title of content in the content-wrapper;

an author tag containing a name of a person that generated the content-file in the content-wrapper;

a date tag containing a date for the content-file in the content-wrapper;

a keywords tag containing keywords describing the content in the content-wrapper.

6. The content-wrapper of claim 2 wherein a metadata tag in the plurality of metadata tags comprises:

a tag identifier that uniquely identifies a search category for the metadata tag;

a local name containing a textual name displayed to a user for the search category;

a mapping field containing a global category for the metadata tag, the global category grouping together metadata tags of different content-wrappers with different tag identifiers and different textual names for the search category for metadata tags having a same purpose;

a tag data field containing metadata describing the content of the content-wrapper.

7. The content-wrapper of claim 6 wherein the search software comprises:

mapping-field search means for performing a criteria search by searching the mapping fields to locate metadata tags in the global category; and compare means, coupled to the mapping-field means, for comparing the metadata in the tag data field for metadata tags in the global category located by the mapping-field search means, the metadata from the tag data field compared to a search term to determine when the content matches search criteria, whereby the search software searches the mapping fields for metadata tags in the global category, and then compares the metadata to the search term.

8. The content-wrapper of claim 7 wherein each metadata tag further comprises:

a tag format field for indicating a format for the metadata in the tag data field; and a tag size field indicating a storage size for the metadata.

9. The content-wrapper of claim 8 wherein the content-wrapper further comprises:

a tag directory having a catalog of the metadata tags, the tag directory having address locations for each of the metadata tags and for the content.

10. A computer-implemented distributed-search method for searching content-wrappers distributed across a network, the computer-implemented distributed-search method comprising the steps of:

(a) finding all package files on a first computer on the network, the package files containing content-wrappers;

(b) reading search-index tags for each of the package files on the first computer, the search-index tags containing descriptive information that represent metadata tags, wherein content files are bound together with the metadata tags in a content-wrapper within the package;

(c) comparing search terms to the metadata tags to determine if a match is found;

(d) when a match is found, sending a confirmation that the match was found; and repeating steps (a), (b), (c), and (d) for other computers on the network besides the first computer;

whereby a centralized search database is not used by the distributed-search.

11. The computer-implemented distributed-search method of claim 10 further comprising the steps of:

displaying the content as a text document when the content represents a textual document file;

displaying the content as a graphics image when the content represents a graphics file;

displaying the content as a sequence of graphics images when the content represents a video file; and playing the content onto audio speakers as an audio sequence when the content represents an audio file, whereby textual, graphics, video, and audio content are described by the metadata tags bound with the content in the content-wrappers.

12. The computer-implemented distributed-search method of claim 10 wherein the step of reading the metadata tags comprises sending the metadata tags across the network to a search engine but not sending the content across the network, whereby network traffic is reduced by not sending the content across the network during searching wherein only search results are transmitted across the network.

13. The computer-implemented distributed-search method of claim 10 further comprising the step of:

initializing a search engine on any of a plurality of nodes on the network, whereby the distributed-search is initiated from any of the plurality of nodes on the network, the distributed-search not having a single point of failure.

14. The computer-implemented distributed-search method of claim 10 further comprising the steps of:

reading a tag-mapping field in the metadata tags and comparing the tag-mapping field to a search category to determine which metadata tags fit in the search category;

comparing text only from metadata tags having tag-mapping fields that match the search category, whereby the distributed search is limited to metadata tags fitting the search category.

15. A searchable network comprising:

a plurality of network nodes including Windows-based personal computers and UNIX workstations, the network nodes each having file storage for storing computer-readable files in a variety of formats;

content-package files stored on the network nodes, each content-package file comprising:
 a content generated by an application program;
 a plurality of metadata tags describing contents of the content, each metadata tag comprising:
  a tag identifier indicating a category of the metadata tag;
  a localized name of the category for displaying to a user;
  a tag-mapping field indicating a broad category that includes the category of the metadata tag;
  a tag data field containing metadata search words describing the contents of the content; and search engines on the plurality of nodes, each search engine for performing a user search by reading the metadata tags on the plurality of network nodes, whereby searchable metadata is stored with the content distributed on the searchable network.

16. The searchable network of claim 15 wherein the variety of formats include textual formats, graphics formats, audio formats, and video formats, wherein non-textual file formats are searchable by the plurality of metadata tags bound to the content.

17. The searchable network of claim 16 wherein the variety of formats includes Windows-readable formats when the content is originally created on a Windows-based personal computer (PC), but the variety of formats also includes UNIX-readable formats when the content is originally created on a UNIX-based computer, whereby the content-package files bind searchable metadata to content on different computing platforms on the searchable network.

18. The searchable network of claim 17 wherein the search engines each comprise:

mapping means for reading the tag-mapping field in the metadata tags and comparing the tag-mapping field to a search category to determine which metadata tags fit in the search category; and compare means for comparing text only from metadata tags having tag-mapping fields that match the search category, whereby the distributed search is limited to metadata tags fitting the search category.

\* \* \* \* \*